Aug. 5, 1924.
F. WECKMAN
1,504,169
LUBRICATING DEVICE
Filed Oct. 26, 1922
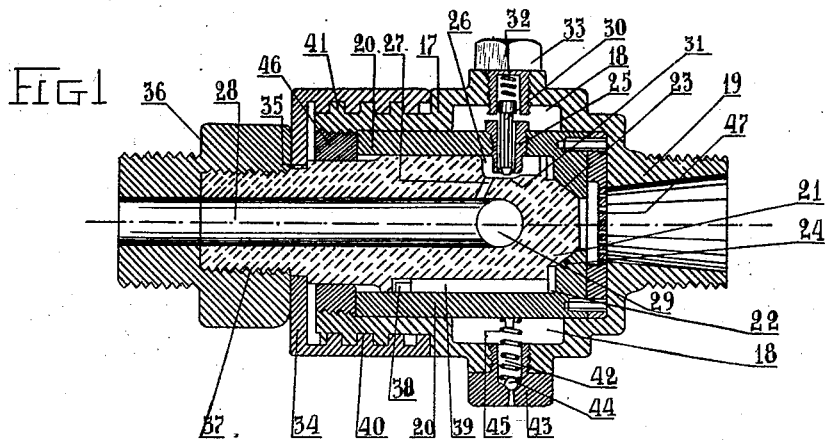
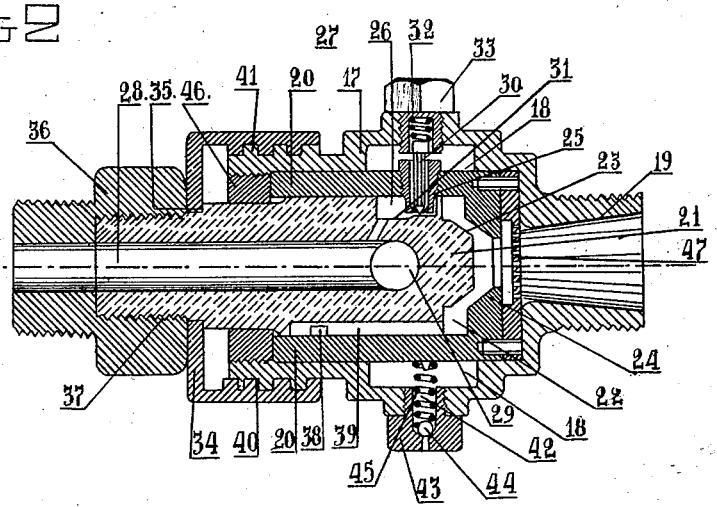
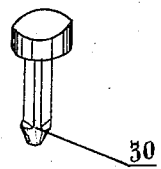
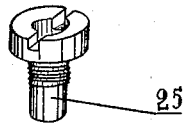
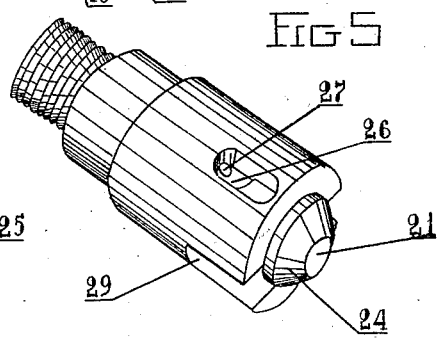
Inventor
F. Weckman
by Langner, Parry, Card & Langner
Attys.

Patented Aug. 5, 1924.

1,504,169

UNITED STATES PATENT OFFICE.

FRANÇOIS WECKMAN, OF HERSTAL, BELGIUM.

LUBRICATING DEVICE.

Application filed October 26, 1922. Serial No. 597,110.

*To all whom it may concern:*

Be it known that I, FRANÇOIS WECKMAN, a subject of the King of Belgium, and resident of Herstal, Belgium, have invented certain new and useful Improvements in or Relating to Lubricating Devices; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

This invention relates to an automatic lubricating device, for use with a valve positioned in the inlet conduit of machines operated by fluid pressure.

In lubricators as known up to the present time, the opening of the valve for controlling admission of lubricating oil into the conduit for the pressure fluid was accomplished by the direct action of the fluid itself, which opened the oil valve against the action of a spring. The quantity of lubricant admitted, therefore, was a function of the pressure of the motive fluid and did not depend in any manner whatever upon the outflow.

According to this invention, the oil chamber of the lubricator is communicated with the inlet conduit by a needle valve, actuated by a portion of the valve in the inlet conduit, so that the needle valve is opened, upon opening of the inlet control valve.

Due to this arrangement the oil chamber can be completely filled, without fear of an undue flow of oil, the oil flowing only when the inlet valve is open, and is a function of its opening. Oil flow is thus a function of flow through the inlet valve, and accordingly is proportional to the effort developed by the machine fed by the inlet valve.

In the form of the device represented, the needle valve is subjected to the action of a spring, at one end, and has its other end bearing against an inclined, movable portion of the inlet valve, movement of the inclined portion, opening the needle valve.

The invention is illustrated by way of example on the accompanying drawings in which—

Figure 1 illustrates a section of a tap provided with a lubricating device in its closed position.

Figure 2 illustrates a section of a tap provided with a lubricating device in its open position.

Figure 3 is a perspective view of the plug of the drop jet.

Figure 4 is a perspective view of the needle valve of the drop jet, and

Figure 5 is a perspective view of a piston which may serve as a valve.

In the case of the application of the lubricating device to a tap as illustrated in Figures 1 to 5, the device consists of a hollow cylindrical body 17 provided with a screwed extension 19 and having a groove 18 which together with a cylindrical jacket 20 fitting tightly inside the member 17, constitutes the oil reservoir.

In the interior of the said reservoir is a cylindrical valve 21 the diameter of which is such that it may slide with slight friction, inside the jacket or cylinder 20.

The front part of the said valve is reduced in diameter so as to form an annular chamber 22 between the valve 21 and the cylindrical jacket 20. The valve 21 has a conical shaped portion 24 which bears against a correspondingly shaped part 23 so as to permit of the passage being closed completely at this point.

The reservoir 18 communicates, by means of a removable plug 25, with a groove 26 having an inclined bottom which communicates by means of a hole 27 with a passage 28 extending through the valve 21 and serving to conduct the fluid under pressure from left to right in Figure 1 into the annular chamber 22 through two passages 29, Fig. 5, arranged at right angles thereto.

The outlet orifice of the said plug, see Figures 3 and 4, is closed by a needle valve 30 the lower end of which projects slightly below the outlet orifice of the plug 25 when the distributing tap is closed, as shown in Figure 1. In this case the lower edges of the plug 25 may rest on the walls of a funnel 31 of the groove 26 thus enabling the needle valve to occupy the closed position which is produced by the action of a spring 32 mounted in the hollow plug 33.

The movement of the valve in the interior of the cylinder is produced by means of a screwed ring 34 secured to the valve 21 between a shoulder 35 thereof and a boss 36 in threaded engagement with the rear end 37 of the valve.

A screwed collar 46 effects the closing of the rear end of the cylinder 20 and also limits the movement of the valve by the shoulder formed at the cylindrical portion of the valve. The said shoulder is conical corresponding with a conical seat provided in the screwed collar 46 so as to ensure effective closing of the rear portion of the cylinder when the valve 21 is fully open.

A key 38 projecting from the cylindrical jacket 20 and engaging with a groove 39 in the valve prevents the latter from rotating when it is being moved longitudinally in the cylinder 20.

By reason of the internal screw thread 40 of the ring 34, which is adapted to engage a thread 41 on the periphery of the cylinder 17, it is possible to move the valve in the longitudinal direction.

By reason of this movement of the valve the end of the needle valve 30 is brought into contact with the bottom of the groove 26 and the needle valve is thus raised until its lower end is almost at the same level as the lower end of the plug 25 as shown in Figure 2.

Under these conditions the oil passes drop by drop through the small opening in the plug and is admitted into the groove 26 from which it is drawn through the orifice 27 by the stream of fluid such as compressed air, entering the longitudinal passage 28 which is connected to the annular chamber by the passages 29.

As illustrated in Figure 4 the body of the needle valve is of triangular section, but it will be understood, that in order to facilitate the passage of oil the section of the body of the needle valve may be circular or rectangular.

It may be mentioned that the connection established between the lubricating device and the tap is particularly applicable in the case of a very viscous oil which necessitates a hermetic closure of the drop jet when the fluid is not flowing through the tap for the purpose of preventing an undesirable flow of oil from the reservoir. It will, however, be understood that in some cases this connection may be omitted and any desired suitable connection used.

The replenishing of the oil reservoir 18 is effected through the passage 42 in the hollow plug 43. The outlet orifice from this passage is closed by a ball 44 subjected to the action of a spring 45 so arranged that the ball may be pushed back when the reservoir is being filled.

A filter 47 is placed over the outlet orifice from the cylindrical chamber in order to prevent the passage of any impurities in the fluid compressed air apparatus.

This filter also plays the part of a vaporizer for the oil which is carried along by the fluid.

This type of lubricating device may be applied equally well to machines utilizing compressed air, steam or any carburetted mixture subjected to the action of an engine.

This lubricating system may be conveniently applied to small internal combustion engines wherein the lubrication is effected by the direct mixing of oil in the petrol tank.

What I claim is:

1. An automatic lubricating device comprising a tap having a plug for regulating the admission of a fluid under pressure, through a fluid passage, a lubricant reservoir, a needle valve controlling communication between the reservoir and the fluid passage, and a rigid connection between the valve and the plug for simultaneously moving the valve and the plug, to open position.

2. An automatic lubricating device for use with an inlet tap, of a fluid pressure operated apparatus, comprising an inlet tap, a valve therein, having an inclined surface, a fluid passage therein, a lubricant reservoir, a needle valve controlling communication between the reservoir and the fluid passage, the needle valve being subjected at one end to the action of a spring, and resting at its other end with its point against the inclined surface of the inlet tap valve.

In testimony whereof I affix my signature in presence of two witnesses.

FRANÇOIS WECKMAN.

Witnesses:
  M. RENSONNET,
  CHARLES MERCHING.